UNITED STATES PATENT OFFICE.

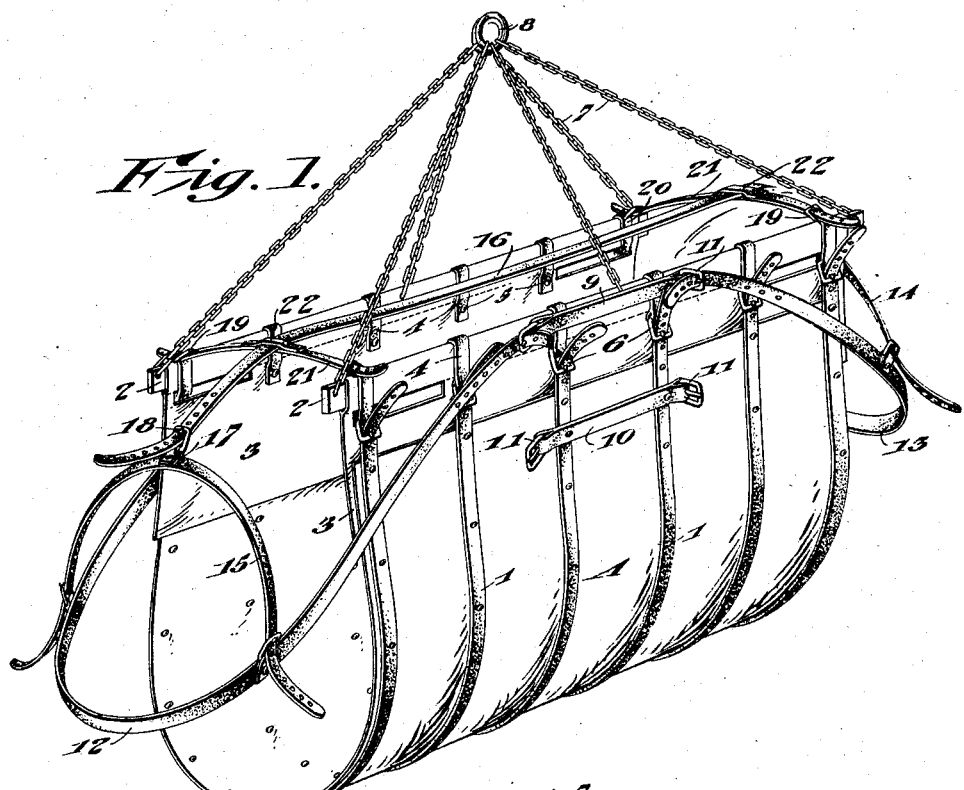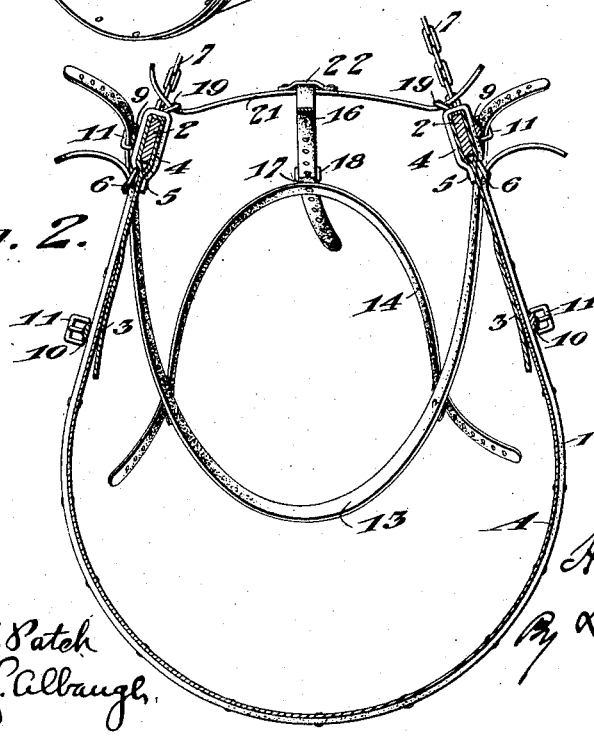

HENRY MILLER, OF PEKIN, ILLINOIS.

HORSE-SWING.

1,015,239.  Specification of Letters Patent.  Patented Jan. 16, 1912.

Application filed April 26, 1911. Serial No. 623,518.

*To all whom it may concern:*

Be it known that I, HENRY MILLER, a citizen of the United States, residing at Pekin, in county of Tazewell and State of Illinois, have invented certain new and useful Improvements in Horse-Swings, of which the following is a specification.

My invention relates to an improvement in horse swings or stocks, and the object is to provide means for adjusting the length of the supporting belt for different sized animals.

A further object is in the provision of means for connecting the breast collar with the breeching by means of a breast strap, and for connecting the breeching and breast strap to the belt.

The invention consists in certain novel features of construction and combinations of parts which will be hereinafter fully described and pointed out in the claims.

In the accompanying drawings, Figure 1 is a perspective view of my invention; and Fig. 2 is a vertical transverse sectional view.

A, represents a canvas belt or body having straps 1, 1, connected thereto, the ends of the straps projecting beyond the edges of the canvas body. Rods 2, 2, are each provided with strips of canvas 3, which are connected to the rod by straps 4, 4, which extend around the rod, and the ends riveted together through the canvas by means of rivets 5, 5, buckles 6, 6, being connected to an end of each strap 4, to which the straps 1, are connected, the strips 3 being overlapped by the canvas body A. Chains 7, 7, extend from each rod to a ring 8, by which rings the swing or stock is suspended. Straps 9 are connected to straps 4, and extend longitudinally of the rods, and connected to straps 1 are straps 10 which extend or lie practically parallel with the straps 9. The straps 9 and 10 are provided with buckles 11 at their ends, to which the breeching strap 12 and breast strap 13 are connected, it depending entirely upon the size of the animal to be suspended as to whether the strap 9 or strap 10 is used. With a small animal, the strap 10 would be used. A neck strap 14 is connected to the breast strap, and the hip strap 15 is connected to the breeching, and connecting these straps are connecting straps 16 and 17 which are connected together by a buckle 18 connected to the strap 17. Buckles 19 are connected to the rods 2 by means of straps 20, and connected to the buckles are cross straps 21 which extend over the back of the animal and are provided with slides 22, through which the strap 16 extends.

From the foregoing, it will be seen that I have provided means whereby the swing or stock can be adjusted to different sizes of animals which are to be suspended for cases of sickness, shoeing or other purposes.

Having fully described my invention, what I claim as new and desire to secure by Letters Patent, is:—

1. In an animal swing or stock, the combination with a flexible body having straps thereon, of rods, means for supporting the rods, means for connecting the straps to the rods for supporting the flexible body, a breeching and breast collar connected to the flexible body, and a back strap connecting the breeching and breast collar.

2. In an animal swing or stock, the combination with a flexible body having straps thereon, of rods, means for supporting the rods, means for connecting the straps to the rods for supporting the flexible body, a breeching and breast collar connected to the flexible body, a back strap connecting the breeching and breast collar, and means connecting the rods for supporting the back strap.

3. In an animal swing or stock, the combination with a flexible body, of rods, means for supporting the rods, means connecting the flexible body to the rods, a breeching and breast strap connected to the body, and means connecting the breeching and breast strap together.

In testimony whereof I affix my signature, in the presence of two witnesses.

HENRY MILLER.

Witnesses:
 FRANK J. WILKINS,
 ESTELLA L. HARMEL.